United States Patent
Ramsden et al.

(10) Patent No.: US 10,273,323 B2
(45) Date of Patent: Apr. 30, 2019

(54) FOULING CONTROL COMPOSITION COMPRISING A POLYMER COMPRISING SILYL ESTER FUNCTIONAL GROUPS AND QUATERNARY AMMONIUM/PHOSPHONIUM GROUPS

(71) Applicant: Akzo Nobel Coatings International B.V., Arnhem (NL)

(72) Inventors: Richard Mark Ramsden, Gateshead (GB); Paul Bassarab, Newcastle upon Tyne (GB); Clayton Price, Whitley Bay (GB)

(73) Assignee: AKZO NOBEL COATINGS INTERNATIONAL B.V., Arnhem (NL)

( * ) Notice: Subject to any disclaimer, the term of this patent is extended or adjusted under 35 U.S.C. 154(b) by 167 days.

(21) Appl. No.: 15/520,917

(22) PCT Filed: Oct. 26, 2015

(86) PCT No.: PCT/EP2015/074692
§ 371 (c)(1),
(2) Date: Apr. 21, 2017

(87) PCT Pub. No.: WO2016/066567
PCT Pub. Date: May 6, 2016

(65) Prior Publication Data
US 2017/0335039 A1    Nov. 23, 2017

(30) Foreign Application Priority Data
Oct. 28, 2014 (EP) .................................. 14190694

(51) Int. Cl.
| | | |
|---|---|---|
| *C08F 220/18* | (2006.01) | |
| *C08F 220/60* | (2006.01) | |
| *C09D 5/16* | (2006.01) | |
| *C09D 133/14* | (2006.01) | |
| *C08F 230/08* | (2006.01) | |

(52) U.S. Cl.
CPC .......... *C08F 220/18* (2013.01); *C08F 220/60* (2013.01); *C09D 5/1637* (2013.01); *C09D 5/1668* (2013.01); *C09D 5/1675* (2013.01); *C09D 133/14* (2013.01); *C08F 2230/085* (2013.01)

(58) Field of Classification Search
CPC .................. C08F 220/18; C08F 220/60; C08F 2230/085; C09D 5/1637; C09D 5/1668; C09D 5/1675; C09D 133/14
USPC ........................................................ 524/558
See application file for complete search history.

(56) References Cited

U.S. PATENT DOCUMENTS

| | | | | |
|---|---|---|---|---|
| 4,593,055 A * | 6/1986 | Gitlitz | ................. | C09D 5/1668 106/15.05 |
| 7,001,953 B2 * | 2/2006 | Chen | ................... | A61K 8/8158 525/123 |

FOREIGN PATENT DOCUMENTS

| | | |
|---|---|---|
| JP | 48-32998 A | 10/1973 |
| JP | 49-16033 A | 4/1974 |
| JP | 08-269389 A | 10/1996 |
| WO | 04/018533 A1 | 3/2004 |
| WO | 10/018144 A1 | 2/2010 |

* cited by examiner

*Primary Examiner* — Kelechi C Egwim
(74) *Attorney, Agent, or Firm* — McDonnell Boehnen Hulbert & Berghoff LLP

(57) ABSTRACT

The present invention relates to a polymer comprising (a1) silyl ester group(s) and (a2) quaternary ammonium group(s) and/or quaternary phosphonium group(s), said quaternary ammonium groups and/or quaternary phosphonium groups being neutralised by counter-ions, wherein the counter-ions consist of the conjugate base of an acid having an aliphatic, aromatic, or alkaryl hydrocarbyl group. The invention further relates to a fouling control coating composition comprising said polymer, a method of protecting a man-made structure immersed in water from fouling, and a substrate or structure coated with the fouling control coating composition.

14 Claims, No Drawings

FOULING CONTROL COMPOSITION COMPRISING A POLYMER COMPRISING SILYL ESTER FUNCTIONAL GROUPS AND QUATERNARY AMMONIUM/PHOSPHONIUM GROUPS

This application is the U.S national phase under 35 U.S.C § 371 of international application PCT/EP2015/074692, filed Oct. 26, 2015, which claims priority to European application EP 14190694.1, filed Oct. 28, 2014.

This invention relates to a polymer which is suitable for use in a fouling control coating composition, a fouling control coating composition comprising the polymer, a method of protecting a man-made structure immersed in water from fouling, and a substrate or structure coated with the fouling control coating composition.

Man-made structures such as boat hulls, buoys, drilling platforms, oil production rigs, and pipes which are immersed in water are prone to fouling by aquatic organisms such as green and brown algae, barnacles, mussels, and the like. Such structures are commonly of metal, but may also comprise other structural materials such as concrete. This fouling is a nuisance on boat hulls, because it increases frictional resistance during movement through the water, the consequence being reduced speeds and increased fuel costs. It is a nuisance on static structures such as the legs of drilling platforms and oil production rigs, firstly because the resistance of thick layers of fouling to waves and currents can cause unpredictable and potentially dangerous stresses in the structure, and, secondly, because fouling makes it difficult to inspect the structure for defects such as stress cracking and corrosion. It is a nuisance in pipes such as cooling water intakes and outlets, because the effective cross-sectional area is reduced by fouling, with the consequence that flow rates are reduced.

It is known to use a fouling control coating composition (a fouling control coating composition is sometimes referred to as antifouling coating composition), for instance as a top coat on ships' hulls, to inhibit the settlement and growth of marine organisms such as barnacles and algae, generally by release of a biocide for the marine organisms.

Traditionally, anti-fouling paints have comprised a relatively inert binder with a biocidal pigment that is leached from the paint. Among the binders which have been used are vinyl resins and rosin. Vinyl resins are seawater-insoluble and paints based on them use a high pigment concentration so as to have contact between the pigment particles to ensure leaching. Rosin is a hard brittle resin that is very slightly soluble in seawater. Rosin-based anti-fouling paints have been referred to as soluble matrix or eroding paints. The biocidal pigment is very gradually leached out of the matrix of rosin binder in use, leaving a skeletal matrix of rosin, which becomes washed off the hull surface to allow leaching of the biocidal pigment from deep within the paint film.

Many successful anti-fouling paints in recent years have been "self-polishing polymer" paints based on a polymeric binder to which biocidal tri-organotin moieties are chemically bound and from which the biocidal moieties are gradually hydrolysed by seawater. In such binder systems, the side groups of a linear polymer unit are split off in a first step by reaction with seawater, the polymer framework that remains becoming water-soluble or water-dispersible as a result. In a second step, the water-soluble or water-dispersible framework at the surface of the paint layer on the ship is washed out or eroded. Such paint systems are described for example in GB-A-1 457 590. As the use of tri-organotin has been restricted by legislation and will become prohibited world-wide, there is a need for alternative anti-fouling substances that can be used in anti-fouling compositions.

A polymer comprising quaternary ammonium/phosphonium groups capped with an acid ("acid-capped quaternised polymer") is an example of a binder polymer comprising blocked functional groups of which the blocking groups can be hydrolysed, dissociated or exchanged with seawater species, the polymer framework that remains becoming soluble or dispersible in seawater as a result, of which said blocking groups are of low toxicity, preferably non-biocidal. WO2004/018533 describes an antifouling coating composition comprising an acid-capped quaternised polymer.

Self-polishing antifouling paint systems have also been developed comprising silyl ester groups. Such antifouling compositions comprising these polymers are, for example, described in WO 00/77102 A1, U.S. Pat. Nos. 4,593,055, 5,436,284 and WO2005005516.

The present inventors have now designed a stable, hydrolysable polymer which when formulated into a fouling control coating has been found to provide improved anti-fouling activity compared to currently known fouling control coatings.

The polymer of the present invention comprises
(a1) silyl ester groups, and
(a2) quaternary ammonium groups and/or quaternary phosphonium groups, said quaternary ammonium groups and/or quaternary phosphonium groups being neutralised by counter-ions, wherein the counter-ions consist of the conjugate base of an acid having an aliphatic, aromatic, or alkaryl hydrocarbyl group.

The silyl ester groups (a1) and/or the quaternary ammonium groups and/or quaternary phosphonium groups (a2) may be located on side chains pendant to the polymer backbone, or alternatively in the backbone of the polymer itself. Preferably however the silyl ester groups (a1) and/or the quaternary ammonium groups and/or quaternary phosphonium groups (a2) are located on side chains pendant to the polymer backbone.

The polymer is obtainable by polymerising monomers comprising silyl ester group(s) (a1), and monomers comprising the quaternary ammonium group(s) and/or quaternary phosphonium group(s) (a2), wherein the quaternary ammonium groups and/or quaternary phosphonium groups being neutralised by counter-ions, wherein the counter-ions consist of the conjugate base of an acid having an aliphatic, aromatic, or alkaryl hydrocarbyl group, and optionally other monomers.

The polymer may be a (meth)acrylic polymer.

By (meth)acrylic polymer we mean a polymer obtainable by polymerisation of acrylic acid, methacrylic acid, or a salt, ester, amide or nitrile derivative thereof, optionally with one or more other vinyl polymerisable monomers. A (meth) acrylic polymer is most typically a polymer obtainable by polymerisation of an acrylic acid ester monomer (an "acrylate monomer") and/or a methacrylic acid ester monomer (a "methacrylate monomer"), optionally one or more other vinyl polymerisable monomers.

The polymer may be formed from at least one (meth) acrylic monomer comprising the silyl ester group(s) (a1), at least one (meth)acrylic monomer comprising the quaternary ammonium group(s) and/or quaternary phosphonium group(s) (a2), and optionally one or more other vinyl polymerisable monomers (a vinyl polymerisable monomer is a monomer having one or more olefinic double bonds).

In an embodiment, the weight ratio of the (meth)acrylic monomers comprising silyl ester groups to (meth)acrylic monomers comprising quaternary ammonium groups and/or quaternary phosphonium groups used to form the polymer ranges from 1:99 to 85:16, preferably from 5:95 to 60:40 and more from preferably from 12:88 to 47:53.

The polymer may additionally be formed from one or more other monomers comprising one or more olefinic double bonds.

The conjugate base of the acid of (a2) preferably comprises an aliphatic, aromatic, or alkaryl hydrocarbyl group comprising 6 or more carbon atoms.

Preferably, the conjugate base of the acid (of (a2)) is a conjugate base of a sulphonic acid. Surprisingly, it has been found that when the conjugate base of the acid (of (a2)) is a conjugate base of a sulphonic acid, the copolymer when formulated into an antifouling coating composition provides better antifouling performance compared to if the conjugate base of the acid (of (a2)) was a conjugate base of a carboxylic acid.

Typically, the polymer of the present invention has a mean degree of polymerisation of at least 3 monomer units. Suitably, the polymer of the present invention has a mean degree of polymerisation of less than 150 monomer units, for example less than 100 monomer units, or less than 50 monomer units. The polymer may therefore have a mean degree of polymerisation with the range of from 3 to 150 monomer units, or from 3 to 100 monomer units, or from 3 to 50 monomer units.

The mean degree of polymerisation is determinable by GPC and the determination of number average molecular weight.

Suitably, the counter-ions of (a2) comprise less than 50 carbon atoms, for example 6 to 50 carbon atoms.

The silyl ester group(s) (a1) may be present on side chain(s) according to the Formula (I).

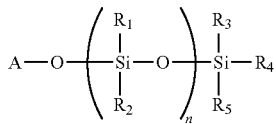

Formula (I)

wherein A is divalent —C(O)— or —S(O)$_2$O— group, n is 0 or an integer of 1 to 50, and $R_1$, $R_2$, $R_3$, $R_4$, and $R_5$ are each independently selected from the group consisting of optionally substituted $C_{1-20}$-alkyl, optionally substituted $C_{1-20}$-alkoxy, optionally substituted $C_{1-20}$ aryl, and optionally substituted $C_{1-20}$ aryloxy.

Typically, n=0 and $R_3$, $R_4$, and $R_5$ are the same or different and represent methyl, isopropyl, n-butyl, isobutyl, ethyl, n-propyl, t-butyl or phenyl.

The side chains according to the Formula (I) are typically bound to the polymer backbone.

The present invention also relates to a fouling control coating composition comprising the polymer described herein and an ingredient having biocidal properties for aquatic organisms. The choice of ingredient having biocidal properties for aquatic organisms is not particularly limited.

The fouling control coating composition may have a VOC of less than 400 g/l and a high shear viscosity of less than 20 poise at 25° C. Preferably the high shear viscosity is less than 10 poise, even more preferably less than 5 poise at 25° C.

The fouling control coating composition may further comprise other components, such as a rosin material, and/or a non-hydrolysing water-insoluble film-forming polymer, for example an acrylate ester polymer or a vinyl ether polymer.

The present invention also relates to a method of protecting a man-made structure immersed in water from fouling by applying the fouling control coating composition to the man-made structure, allowing the fouling control coating composition to form a coating and then immersing the coated man-made structure in water. Examples of such man-made structures immersed include boat hulls, buoys, drilling platforms, oil production rigs, and pipes.

The present invention also relates to a substrate or structure coated with fouling control coating composition of the present invention.

Surprisingly, fouling control coating compositions comprising the polymer of the present invention have superior antifouling activity over fouling control coating compositions comprising polymers comprising just one of the functional groups (a1) or (a2).

Further the coatings of the present invention have a high integrity, i.e. show almost no cracking and a good adhesion, particularly when applied to those parts of a vessel where the coating is alternately wet and dry, for instance at the waterline. Additionally, the coating composition dries sufficiently quickly.

For the current invention, the mean degree of polymerisation may be determined from the number average molecular weight as measured by GPC (gel permeation chromatography) and expressed as the absolute number average molecular weight. Polydispersity (D), sometimes also referred to as molecular weight distribution, is defined as the ratio of the weight-average molecular weight (Mw) to the number-average molecular weight (Mn) of the polymer (D=Mw/Mn). The absolute number average molecular weight and absolute weight average molecular weight may be obtained from GPC by the triple detection approach, using light scattering, viscometer and concentration detectors in combination. GPC of the polymer of the present invention may conveniently be performed using hexafluoroisopropanol (HFiP) as solvent.

The VOC level of a composition can be measured according to EPA reference method 24 in conjunction with ASTM standard D 3960-02 or calculated in accordance with ASTM standard D 5201-01. Both methods normally lead to similar results. When a value is given for the viscosity of a polymer solution or coating composition according to the present invention, reference is made to the high shear viscosity measured using a cone and plate viscometer in accordance with ASTM standard D 4287-00.

(a1) Silyl Ester Groups

The polymer of the present invention comprises (a1) silyl ester groups. Preferably the silyl ester groups (a1) are located on side chains pendant to the polymer backbone. For example, the polymer may formed from at least one (meth)acrylic monomer comprising the silyl ester group(s) (a1) and at least one (meth)acrylic monomer comprising the quaternary ammonium group(s) and/or quaternary phosphonium group(s) (a2).

The silyl ester group(s) (a1) may be present on side chain(s) (pendant to the polymer back bone) according to the Formula (I):

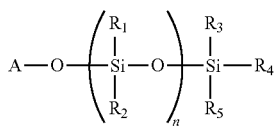
Formula (I)

wherein A is divalent —C(O)— or —S(O)$_2$O— group, n is 0 or an integer of 1 to 50, and $R_1$, $R_2$, $R_3$, $R_4$, and $R_5$ are each independently selected from the group consisting of optionally substituted $C_{1-20}$-alkyl, optionally substituted $C_{1-20}$-alkoxy, optionally substituted $C_{1-20}$ aryl, and optionally substituted $C_{1-20}$ aryloxy.

Preferably, n=0 and $R_3$, $R_4$, and $R_5$ are the same or different and represent methyl, isopropyl, n-butyl, isobutyl, ethyl, n-propyl, t-butyl or phenyl.

In the present context, the term $C_{1-20}$-alkyl represents straight, branched, and cyclic hydrocarbon groups having from 1 to 20 carbon atoms, such as methyl, ethyl, propyl, isopropyl, n-butyl, iso-butyl, sec-butyl, tert-butyl, pentyl, hexyl, cyclohexyl, heptyl, octyl, nonyl, decyl, undecyl, dodecyl, tertadecyl, hexadecyl, octadecyl, and icosyl. The term substituted $C_{1-20}$-alkoxy means $C_{1-20}$-alkyloxy, such as methoxy, ethoxy, propoxy, isopropoxy, n-butoxy, iso-butoxy, sec-butoxy, tert-butoxy, pentoxy, hexoxy, cyclohexoxy, heptoxy, octoxy, nonoxy, decoxy, undecoxy, dodecoxy, tertadecoxy, hexadecoxy, octadecoxy, and ocosoxy. The term aryl is to be understood to mean an aromatic carbocyclic ring or ring system, such as phenyl, naphthyl, biphenyl, and xylyl.

The term "optionally substituted" is used to indicate that the group in question may be substituted with substituents one or more times, preferably 1 to 5 times. These substituents may, for example, be hydroxy, alkyl, hydroxyalkyl, alkyl-carbonyloxy, carboxy, alkoxycarbonyl, alkoxy, alkenyloxy, oxo, alkylcarbonyl, aryl, amino, alkylamino, carbamoyl, alkylaminocarbonyl, aminoalkylaminocarbonyl, aminoalkylaminocarbonyl, alkylcarbonylamine, cyano, guanidino, carbamido, alkanoyloxy, sulphono, alkylsulphonyloxy, nitro, sulphanyl, alkylthio, and halogen.

Monomers comprising a silyl ester group (a1) which can be polymerised to prepare the polymer of the present invention includes olefinically unsaturated monomers represented by the Formula (II):

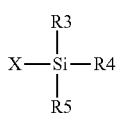
Formula (II)

wherein $R_3$, $R_4$, and $R_5$ are as defined above, and X is a (meth)acryloyloxy group, a maleinoyloxy group, a fumaroyloxy group, or an itaconyloxy group.

The preparation of the above monomer can, for example, be performed according to the methods described in EP 0 297 505 or according to the methods described in EP 1 273 589 and the references cited therein.

Examples of suitable (meth)acrylic acid monomers comprising the silyl ester group (a1) which may be used to prepare the polymer of the present invention include: trimethylsilyl (meth)acrylate, triethylsilyl (meth)acrylate, tri-n-propylsilyl (meth)acrylate, triisopropylsilyl (meth)acrylate, tri-n-butylsilyl (meth)acrylate, triisobutylsilyl (meth)acrylate, tri-tert-butylsilyl (meth)acrylate, tri-n-amylsilyl (meth)acrylate, tri-n-hexylsilyl (meth)acrylate, tri-n-octylsilyl (meth)acrylate, tri-n-dodecylsilyl (meth)acrylate, triphenylsilyl (meth)acrylate, tri-p-methylphenylsilyl (meth)acrylate, tribenzylsilyl (meth)acrylate, dimethylphenylsilyl (meth)acrylate, dimethylcyclohexyl (meth)acrylate, ethyldimethylsilyl (meth)acrylate, n-butyldimethylsilyl (meth)acrylate, t-butyldimethylsilyl (meth)acrylate, diisopropyl-n-butylsilyl (meth)acrylate, n-octyldi-n-butylsilyl (meth)acrylate, diisopropyl-stearylsilyl (meth)acrylate, dicyclohexylphenylsilyl (meth)acrylate, t-butyl-diphenylsilyl (meth)acrylate, and lauryldiphenylsilyl (meth)acrylate. Preferably, triisopropylsilyl (meth)acrylate, tri-n-butylsilyl (meth)acrylate, or triisobutylsilyl (meth)acrylate is used in the preparation of the polymer.

(a2) Quaternary Ammonium Groups and/or Quaternary Phosphonium Groups Neutralised by Counter-Ions The polymer of the present invention comprises (a2) quaternary ammonium groups and/or quaternary phosphonium groups, said quaternary ammonium groups and/or quaternary phosphonium groups being neutralised by counter-ions, wherein the counter-ions consist of the conjugate base of an acid have an aliphatic, aromatic, or alkaryl hydrocarbyl group.

Typically, the quaternary ammonium groups and/or quaternary phosphonium groups (a2) are located on side chains pendant to the polymer backbone.

Monomer units comprising side chains comprising said quaternary ammonium groups and/or quaternary phosphonium groups which may be used to prepare the polymer of the present invention are obtainable by, 1. quaternisation of an amine- or phosphine-functional monomer of the Formula (III):

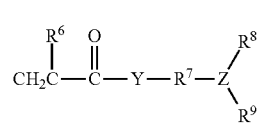
Formula (III)

with a dialkyl carbonate wherein each alkyl group is independently a $C_1$-$C_5$ alkyl
wherein
Y is O or NH, Z is N or P, $R^6$ is a hydrogen atom or a $C_1$-$C_4$ alkyl group, preferably hydrogen or a $C_1$-$C_2$ alkyl group,
$R^7$ is a $C_2$ or a $C_3$-$C_{12}$ divalent hydrocarbon group, preferably a $C_2$ or a $C_3$-$C_8$ divalent hydrocarbon group, more preferably a $C_2$ or a $C_3$-$C_4$ divalent hydrocarbon group,
$R^8$ and $R^9$ independently represent a $C_1$-$C_6$ alkyl group, preferably methyl, or an optionally substituted phenyl group, and then 2. replacement of the counter-ion of the resulting quaternised ammonium or phosphonium monomer by an alternative conjugate base of an acid, preferably a conjugate base of an acid having an aliphatic, aromatic, or alkaryl hydrocarbon group comprising 6 or more carbon atoms. This would result in a quaternised monomer that is capped with a counter-ion, wherein the counter-ion consists of a conjugate base (an anionic residue) of an acid having an aliphatic hydrocarbon group comprising 6 or more carbon atoms.

The result of this process is a monomer of the Formula (IV), which may be used to prepare the polymer of the present invention, having a quaternary ammonium group and/or quaternary phosphonium group (Z+) neutralised by a counter-ion (X−):

Formula (IV)

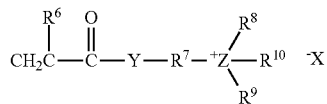

wherein Y, Z, $R^6$, $R^7$, $R^8$, and $R^9$ are as specified above, $R^{10}$ is a $C_1$-$C_5$ alkyl group, preferably $R^{10}$ is methyl, and $X^-$ is a conjugate base of an acid comprising an aliphatic, aromatic, or alkaryl hydrocarbyl group. For example, $X^-$ may be a $[O\text{—}C(O)\text{—}R^{11}]^-$ anion or a $[O\text{—}S(O)_2\text{—}R^{11}]^-$ anion, wherein $R^{11}$ is a monovalent alkyl comprising 6 to 50 carbon atoms.

The quaternisation of an amine- or phosphine-functional monomer of formula (III) (Step 1) can be performed, for example, by reacting the monomer of Formula (III) with a dialkyl carbonate wherein each alkyl group is independently a $C_1$-$C_5$ alkyl group. The dialkyl carbonate may be for example dimethyl carbonate, ethylmethyl carbonate, diethyl carbonate, or dipropyl carbonate. Most preferred is a reaction using dimethyl carbonate.

The reaction conditions can be as described in EP-A-291 074 for the quaternisation of a tertiary amine $R^xR^yR^zN$ wherein $R^x$, $R^y$, and $R^z$ represent hydrocarbon residues. Normally, the reaction can take place in the presence or absence of a solvent, at a reaction temperature of from 20° C. to 200° C. Preferably, the reaction is performed at a temperature of from 115° C. to 135° C. in the presence of an alcohol, preferably methanol, under an increased pressure of about 90 psi to 100 psi (6.1 $10^5$ Pa to 6.8 $10^5$ Pa).

The replacement of the counter-ion of the quaternary ammonium or quaternary phosphonium monomer (Step 2) can be performed using an alternative acid having an aliphatic, aromatic, or alkaryl hydrocarbon group. For example, the acid may be a carboxylic acid, a sulphonic acid, or a sulphate acid. Preferably, the acid comprises 6 or more carbon atoms, more preferably 8 or more carbon atoms. The acid preferably comprises up to 50 carbon atoms, even more preferably up to 30 carbon atoms, and most preferred up to 20 carbon atoms.

The Polymer Comprising (a1) and (a2)

The polymer of the present invention is obtainable by polymerising monomers comprising silyl ester group(s) (a1), monomers comprising the quaternary ammonium group(s) and/or quaternary phosphonium group(s) (a2) as herein described, and optionally other monomers.

The polymer of the present invention may have a mean degree of polymerization of at least 3 monomer units. The polymer of the present invention may have a mean degree of polymerization of less than 150 monomer units, for example less than 100 monomer units, or less than 50 monomer units. The polymer therefore may have a mean degree of polymerisation within the range of from 3 to 150 monomer units, or from 3 to 100 monomer units, or from 3 to 50 monomer units.

The polymer preferably has a weight-average molecular weight of more than 10,000. For example, the weight-average molecular weight may be more than 10,000 and less than 90,000. The weight-average molecular weight may be more than 20,000. The weight-average molecular weight may be less than 70,000.

The mean degree of polymerization is determinable from the number average molecular weight as measured by GPC (gel permeation chromatography) and expressed as the absolute number average molecular weight. The absolute number average molecular weight and absolute weight average molecular weight may be obtained from GPC by the triple detection approach, using light scattering, viscometer and concentration detectors in combination. GPC of the polymer of the present invention may conveniently be performed using hexafluoroisopropanol (HFiP) as solvent.

The polymer preferably has a polydispersity of less than 5, even more preferably less than 3.5. The polymer preferably has a glass transition temperature less than 200° C., even more preferably less than 150° C.; most preferably the glass transition temperature less than 125° C.

The glass transition temperature is the calculated glass transition determined according to the method set out in ASTM standard D3418-03 'Standard test method for transition temperature of polymers by Differential Scanning Calorimety'.

Preferably, the silyl ester groups (a1) and/or the quaternary ammonium groups and/or quaternary phosphonium groups (a2) are located on side chains that are pendant to the polymer backbone.

Typically, the polymer is formed from at least one (meth)acrylic monomer comprising the silyl ester group(s) (a1) and at least one (meth)acrylic monomer comprising the quaternary ammonium group(s) and/or quaternary phosphonium group(s) (a2), and optionally other vinyl polymerisable monomers.

Typically, the weight ratio of the (meth)acrylic monomers comprising silyl ester groups to (meth)acrylic monomers comprising quaternary ammonium groups and/or quaternary phosphonium groups used to form the polymer ranges from 1:99 to 85:16, preferably from 5:95 to 60:40, more preferably from 12:88 to 47:53.

Typically, the polymer is also formed from one or more other vinyl polymerisable monomers (monomers comprising one or more olefinic double bonds). The other vinyl polymerisable monomers may comprise one or more (meth)acrylate esters such as methyl methacrylate, ethyl methacrylate, butyl methacrylate, 2-ethylhexyl methacrylate, 2-hydroxyethyl methacrylate, and methoxyethyl methacrylate; maleic acid esters such as dimethyl maleate and diethyl maleate; fumaric acid esters such as dimethyl fumarate and diethyl fumarate; styrene, vinyl toluene, α-methyl-styrene, vinyl chloride, vinyl acetate, butadiene, acrylamide, acrylonitrile, methacrylic acid, acrylic acid, isobornyl methacrylate, maleic acid, and mixtures thereof.

Preferably the vinyl polymerisable monomers comprise an ester of (meth)acrylic acid with an alcohol bearing 4 or more carbon atoms. Examples of suitable esters of (meth)acrylic acid with an alcohol bearing 4 or more carbon atom include n-butyl (meth)acrylate, iso-butyl (meth)acrylate, tert-butyl (meth)acrylate, n-pentyl (meth)acrylate, iso-pentyl (meth)acrylate, neo-pentyl (meth)acrylate, n-hexyl (meth)acrylate, iso-hexyl (meth)acrylate, cyclohexyl (meth)acrylate, benzyl (meth)acrylate, phenyl (meth)acrylate, ethylhexyl (meth)acrylate, octyl (meth)acrylate, bornyl (meth)acrylate, and isobornyl (meth)acrylate. Preferably the ester of (meth)acrylic acid with an alcohol bearing 4 or more carbon atoms is butyl (meth)acrylate or isobornyl (meth)acrylate. Such monomers are relatively hydrophobic. It is possible to adjust the polishing rate of the coating by using a mixture of a hydrophobic and a hydrophilic (meth)acrylate monomers. Examples of hydrophilic comonomers are methoxy ethyl (meth)acrylate or higher polyethylene oxide derivatives, such as ethoxy ethyl (meth)acrylate, propoxy ethyl (meth)acrylate, butoxy ethyl (meth)acrylate, a polyoxyethylene glycol monoalkyl ether (meth)acrylate, such as polyoxyethylene (n=8) glycol monomethyl ether methacrylate, or N-vinyl pyrrolidone.

The polymer of the invention is therefore obtainable by reacting monomer units comprising (a1) silyl ester groups, and (a2) quaternary ammonium groups and/or quaternary phosphonium groups as herein described, and optionally one or more other monomers such as those described herein.

The rate at which the fouling control coating composition according to the current invention dissolves or erodes in seawater can be adjusted by the structure of the blocking groups (acid counter ions) on (a2), substantially without problems related to the toxicity of the released groups. Preferably, the blocking groups comprise a conjugate base of an acid having an aliphatic hydrocarbon group comprising 6 to 50 carbon atoms, more preferably 6 to 20 carbon atoms.

In general, the reaction temperature at which the polymer is prepared has an influence on the molecular weight of the polymer. The molecular weight can additionally or alternatively be adjusted by the amount of initiator used and/or by adding a change transfer agent, e.g. a thiol. The type of initiator influences the degree of polydispersity. For example, the polydispersity may be lowered by choosing an azo-initiator, e.g. azobis-isobutyronitrile or azobis-methyl-butyronitrile. Alternatively or additionally, the solvent in which the reaction takes place can be adjusted to adjust the molecular weight of the polymer and its polydispersity. The viscosity of the polymer solution and/or the coating composition can be adjusted by adjusting the molecular weight of the polymer and/or by adjusting its polydispersity, and/or by adjusting the solids content. Typically the monomers are reacted at an elevated temperature together with an initiator solution. Initiator boosters may be added during the reaction process.

Optional Components:

The fouling control coating composition may comprise further resins which are seawater-reactive and/or slightly soluble or water-sensitive in seawater. These other resin(s) can form up to 50 weight percent of the total weight of the coating composition.

Further Seawater-Reactive Polymer(s) The coating composition may optionally comprise further seawater-reactive polymers. One example is an acid-functional film-forming polymer the acid groups of which are blocked by groups capable of hydrolysing or dissociating to leave a polymer soluble in seawater, the blocking groups being selected from divalent metal atoms bonded to a monovalent organic residue, divalent metal atoms bonded to a hydroxyl residue, and monoamine groups which form an organic solvent-soluble amine salt of the polymer, as described in WO 00/43460. For instance, such a seawater-reactive, acid-functional film-forming polymer the acid groups of which are blocked may be a polymer having at least one side chain bearing at least one terminal group of the formula:

—X—[O-M-R]$_n$ wherein X represents

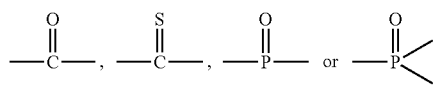

M is a metal selected from zinc, copper, and tellurium; x is an integer of 1 to 2;

R represents an organic residue selected from

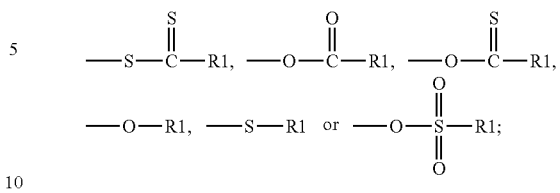

and
R1 is a monovalent organic residue, as described in EP-A-204 456.

Such a hydrolysable polymer preferably is an acrylic polymer wherein X represents

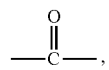

M is copper, and R represents

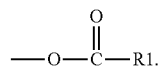

The parent acrylic polymer having a —COOH group instead of —X—[O-M-R]$_n$ preferably has an acid value of 25-350 mg KOH/g. Most preferably, the hydrolysable polymer has a copper content of 0.3-20 weight percent and R1 is the residue of a high boiling organic monobasic acid. Such hydrolysable polymers can be prepared by the processes disclosed in EP 0 204 456 and EP 0 342 276. The copper-containing film-forming polymer preferably is a polymer comprising an acrylic or methacrylic ester the alcohol residue of which includes a bulky hydrocarbon radical or a soft segment, for example a branched alkyl ester having 4 or more carbon atoms or a cycloalkyl ester having 6 or more atoms, a polyalkylene glycol monoacrylate or monomethacrylate optionally having a terminal alkyl ether group or an adduct of 2-hydroxyethyl acrylate or methacrylate with caprolactone, as described in EP 0 779 304.

Alternatively, such a seawater-reactive, acid-functional film-forming polymer the acid groups of which are blocked may be a carboxylic acid-functional polymer. For example, it may be a polymer of acrylic or methacrylic acid with one or more alkyl acrylates or methacrylates, at least some of the acid groups of which have been converted to groups of the formula —COO-M-OH, wherein M is a divalent metal such as copper, zinc, calcium, magnesium or iron, as described in GB 2,311,070.

Another example of such a seawater-reactive, acid-functional film-forming polymer the acid groups of which are blocked is a polymer that is a salt of an amine. Preferably, it is a salt of an amine containing at least one aliphatic hydrocarbon group having 8 to 25 carbon atoms and an acid-functional film-form ing polymer as described in EP 0 529 693, the acid-functional polymer preferably being an addition polymer of an olefinically unsaturated carboxylic acid, sulphonic acid, acid sulphate ester, phosphonic acid or acid phosphate ester and at least one olefinically unsaturated co-monomer, the unsaturated carboxylic acid for example being acrylic or methacrylic acid, the unsaturated sulphonic acid for example being 2-acrylamido-2-methylpropane sulphonic acid (AMPS), and the film-forming polymer preferably being an amine sulphonate polymer containing units of an organocyclic ester as described in WO 99/37723.

Further Resin(s) that are Slightly Soluble or Water-Sensitive in Seawater

The coating composition may optionally comprise further resins that are slightly soluble or water-sensitive in seawater. As examples of suitable polymers or resins that are slightly soluble or water-sensitive in seawater the following compounds may be mentioned: vinyl ether polymer, for example a poly(vinyl alkyl ether), such as polyvinyl methyl ether, polyvinyl ethyl ether, polyvinyl propyl ether and polyvinyl isobutyl ether, or a polymer of a vinyl alkyl ether with vinyl acetate or vinyl chloride; alkyd resins, modified alkyd resins; polyurethanes; saturated polyester resins; poly-N-vinyl pyrollidones; epoxy polymers; epoxy esters; epoxy urethanes; linseed oil, castor oil, soybean oil and derivatives of such oils; acrylate ester polymers such as a homopolymer or polymer of one or more alkyl acrylates or methacrylates which preferably contain 1 to 6 carbon atoms in the alkyl group and may contain a co-monomer such as acrylonitrile or styrene; vinyl acetate polymers such as polyvinyl acetate or a vinyl acetate vinyl chloride polymer; polyamine, particularly a polyamide having a plasticising effect such as a polyamide of a fatty acid dimer or the polyamide sold under the Trademark "Santiciser", and rosin material.

Such a rosin material may be rosin, particularly wood rosin or alternatively tall rosin or gum rosin. The main chemical constituent of rosin is abietic acid. The rosin can be any of the grades sold commercially, preferably that sold as WW (water white) rosin. The rosin material can alternatively be a rosin derivative, for example a maleinised or fumarised rosin, hydrogenated rosin, formylated rosin or polymerised rosin, or a rosin metal salt such as calcium, magnesium, copper or zinc rosinate. The coating composition may contain no rosin material.

Optional Additives:

Additives that can be added to the fouling control coating composition include, reinforcing agents, stabilisers, thixotropes or thickening agents, plasticisers, liquid carriers and non-biocidal pigments.

Examples of suitable reinforcing agents that can be added to the fouling control coating composition are fibres, e.g., carbide fibres, silicon-containing fibres, metal fibres, carbon fibres, sulphide fibres, phosphate fibres, polyamide fibres, aromatic polyhydrazide fibres, aromatic polyester fibres, cellulose fibres, rubber fibres, acrylic fibres, polyvinylchloride fibres, and polyethylene fibres. Preferably, the fibres have an average length of 25 to 2,000 microns and an average thickness of 1 to 50 microns with a ratio between the average length and the average thickness of at least 5. Examples of suitable stabiliser agents are moisture scavengers, zeolites, aliphatic or aromatic amines such as dehydroabietylamine, tetraethylorthosilicate, and triethyl orthoformate.

Examples of suitable thixotropes or thickening agents are silicas, bentones, and polyamide waxes.

Examples of suitable non-polymeric plasticisers are phthalate esters such as dibutyl phthalate, butyl benzyl phthalate or dioctyl phthalate, phosphate triesters such as tricresyl or tris(isopropyl)phenyl phosphate, or chlorinated paraffins, and sulphonamides such as N-substituted toluene sulphonamide.

Such a plasticiser can for example be present at up to 50% by weight based on the total binder polymer, most preferably at least 10% and up to 35% by weight based on the binder polymer.

Examples of suitable liquid carriers are organic solvents, organic non-solvents, and water. Suitable examples of organic solvents are an aromatic hydrocarbon such as xylene, toluene or trimethyl benzene, an alcohol such as n-butanol, an ether alcohol such as butoxyethanol or methoxypropanol, an ester such as butyl acetate or isoamyl acetate, an ether-ester such as ethoxyethyl acetate or methoxypropyl acetate, a ketone such as methyl isobutyl ketone or methyl isoamyl ketone, an aliphatic hydrocarbon such as white spirit, or a mixture of two or more of these solvents. It is possible to disperse the coating in an organic non-solvent for the film forming components in the coating composition. Alternatively, the coating can be water-based; for example, it can be based on an aqueous dispersion.

Examples of non-biocidal pigments that can be added to a composition comprising the polymer comprising (a1) silyl ester groups and (a2) quaternary ammonium and/or quaternary phosphonium groups as herein described and the ingredient having biocidal properties for aquatic organisms are slightly seawater-soluble non-biocides such as zinc oxide and barium sulphate and seawater-insoluble non-biocides such as fillers and colouring pigments, e.g., titanium dioxide, ferric oxide, phthalocyanine compounds, and azo pigments. Such highly insoluble pigments are preferably used at less than 60% by weight of the total pigment component of the paint, most preferably less than 40%.

The coating composition preferably has a pigment volume concentration of 15 to 60%.

The Ingredient Having Biocidal Properties for Aquatic Organisms

The ingredient having marine biocidal properties usually is a biocide for aquatic organisms. This biocide can be mixed with the polymers using conventional paint-blending techniques. When the ingredient having marine biocidal properties is a pigment, it can be all or part of the pigment of the paint.

The biocide of the present invention can be one or more of an inorganic, organometallic, metal-organic or organic biocide for marine or freshwater organisms. Examples of inorganic biocides include copper metal and copper salts such as copper oxide, copper thiocyanate, copper bronze, copper carbonate, copper chloride, copper nickel alloys, and silver salts such as silver chloride or nitrate; organometallic and metal-organic biocides include zinc pyrithione (the zinc salt of 2-pyridinethiol-1-oxide), copper pyrithione, bis (N-cyclohexyl-diazenium dioxy) copper, zinc ethylene-bis (dithiocarbamate) (i.e. zineb), zinc dimethyl dithiocarbamate (ziram), and manganese ethylene-bis(dithiocarbamate) complexed with zinc salt (i.e. mancozeb); and organic biocides include formaldehyde, dodecylguanidine monohydrochloride, thiabendazole, N-trihalomethyl thiophthalimides, trihalomethyl thiosulphamides, N-aryl maleimides such as N-(2,4,6-trichlorophenyl) maleimide, 3-(3,4-dichlorophenyl)-1,1-dimethylurea (diuron), 2,3,5,6-tetrachloro-4-(methylsulphonyl) pyridine, 2-methylthio-4-butylamino-6-cyclopopylamino-s-triazine, 3-benzo[b]thien-yl-5,6-dihydro-1,4,2-oxathiazine 4-oxide, 4,5-dichloro -2-(n-octyl)-3(2H)-isothiazolone, 2,4,5,6-tetrachloroisophthalonitrile, tolylfluanid, dichlofluanid, diiodomethyl-p-tosylsulphone, capsciacin, N-cyclopropyl-N'-(1,1-dimethylethyl)-6-(methylthio)-1,3,5-triazine-2,4-diamine, 3-iodo-2-propynylbutyl carbamate, medetomidine, 1,4-dithiaanthraquinone-2,3-dicarbonitrile (dithianon), boranes such as pyridine triphenylborane, a 2-trihalogenomethyl-3-halogeno-4-cyano pyrrole derivative substituted in position 5 and optionally in position 1, such as 2-(p-chlorophenyl)-3-cyano-4-bromo-5-trifluoromethyl pyrrole (tralopyril), and a furanone, such as 3-butyl-5-(dibromomethylidene) -2(5H)-furanone, and mixtures thereof, macrocyclic lactones such as avermectins, for example avermectin B1, ivermectin, doramectin, abamectin, amamectin and selamectin, and quaternary ammonium salts such as didecyldimethylammonium chloride and an alkyldimethylbenzylammonium chloride.

In the context of the present invention, an inorganic biocide is a biocide whose chemical structure comprises a metal atom and which is free of carbon atoms; an organometallic biocide is a biocide whose chemical structure comprises a metal atom, a carbon atom, and a metal-carbon bond; a metal-organic biocide is a biocide whose chemical structure comprises a metal atom, a carbon atom, and which is free of metal-carbon bonds; and an organic biocide is biocide whose chemical structure comprises a carbon atom and which is free of metal atoms.

Furthermore, the biocide may optionally be wholly or partially encapsulated, adsorbed or supported or bound. Certain biocides are difficult or hazardous to handle and are advantageously used in an encapsulated or absorbed or supported or bound form. Additionally, encapsulation, absorption or support or binding of the biocide can provide a secondary mechanism for controlling biocide leaching rate from the coating system in order to achieve an even more gradual release and long lasting effect.

The method of encapsulation, adsorption or support or binding of the biocide is not particularly limiting for the present invention. Examples of ways in which an encapsulated biocide may be prepared for use in the present invention include mono and dual walled amino-formaldehyde or hydrolysed polyvinyl acetate-phenolic resin capsules or microcapsules as described in EP1791424.

Examples of ways in which an absorbed or supported or bound biocide may be prepared include the use of host-guest complexes such as clathrates as described in EP0709358, phenolic resins as described in EP0880892, carbon-based adsorbents such as those described in EP1142477, or inorganic microporous carriers such as the amorphous silicas, amorphous aluminas, pseudoboehmites or zeolites described in EP1115282.

The invention will be elucidated with reference to the following examples. These are intended to illustrate the invention but are not to be construed as limiting in any manner the scope thereof.

EXAMPLES

Example 1

Preparation of the Polymer in Accordance with the Invention

First the (a2) monomer was prepared in the following manner: Dimethylaminopropyl methacrylamide (192.1 g), dimethylcarbonate (179.6 g) and methanol (208 g), were placed in a stainless steel, high pressure reaction vessel. The sealed vessel was heated to 125° C. for 4 hours. The cooled solution was filtered and dried in vacuo after addition of methanol (150 g). The resulting viscous amber liquid, consisting substantially of the corresponding alkyltrimethyl ammonium carbonate (244.7 g) was diluted with xylene (200 g) and placed in a 2 L round bottom flask. To this was added at room temperature with stirring over 30 minutes a solution of dodecylbenzenesulphonic acid (244.7 g) in xylene (200 g), and stirring was continued overnight to provide a solution of the sulphonic acid-capped quaternised monomer in xylene.

To a stirred polymerisation reaction vessel containing xylene (372.3 g) at 85° C. was added a solution of monomers consisting of a solution of the sulphonic acid-capped quaternised monomer prepared as described above (237.2 g), isobornyl methacrylate (217.6 g), butyl methacrylate (139.2 g), tri-isopropylsilyl methacrylate (59.2 g) and 2,2'-azodi(2-methylbutyronitrile) (AMBN) initiator (4.7 g) in xylene (42.4 g) at constant rate over 5 hours. The temperature was increased to 95° C. and a solution of AMBN (2.35 g) in xylene (21.15 g) was added and the reaction vessel was maintained at this temperature for 2 hours. The reaction vessel was cooled to room temperature to provide the polymer of Example 1.

Example 2

Preparation of a Comparative Polymer (Comprising (a2) but No (a1))

To a stirred polymerisation reaction vessel containing xylene (162.9 g) and butanol (162.9 g) at 85° C. was added a solution of monomers consisting of a solution of the sulphonic acid-capped quaternised monomer prepared as described in Example 1 above (474.5 g), isobornyl methacrylate (217.6 g), butyl methacrylate (139.2 g) and 2,2'-azodi(2-methylbutyronitrile) (AMBN) initiator (4.7 g) in xylene (42.4 g) at constant rate over 5 hours. The temperature was increased to 95° C. and a solution of AMBN (2.35 g) in xylene (21.15 g) was added and the reaction vessel was maintained at this temperature for 2 hours. The reaction vessel was cooled to room temperature to provide the polymer of Example 2.

Example 3

Preparation of a Comparative Polymer (Comprising (a1) but No (a2))

To a stirred polymerisation reaction vessel containing xylene (441.9 g) and butanol (441.9 g) at 85° C. was added a solution of monomers consisting of tri-isopropylsilyl methacrylate (125.0 g), isobornyl methacrylate (459.3 g), butyl methacrylate (293.8 g) and 2,2'-azodi(2-methylbutyronitrile) (AMBN) initiator (9.9 g) in xylene (44.7 g) and butanol (44.7 g) at constant rate over 5 hours. The temperature was increased to 95° C. and a solution of AMBN (5.0 g) in xylene (22.35 g) and butanol (22.35 g) was added and the reaction vessel was maintained at this temperature for 2 hours. The reaction vessel was cooled to room temperature to provide the polymer of Example 3.

Example 4

Preparation of a Fouling Control Coating Composition in Accordance with the Invention The following materials were mixed in the stated amounts by weight using a high speed disperser to form an fouling-control paint according to the invention

| Name | Description | Wt % |
| --- | --- | --- |
| Polymer of example 1 | Binder | 23 |
| Chlorinated paraffin (Cereclor 48, Ineos Chlor) | Plasticiser | 5 |

-continued

| Name | Description | Wt % |
|---|---|---|
| Copper pyrithione (Lonza) | Biocide | 4 |
| Iron oxide (Bayferrox 130BM) | Pigment | 7 |
| Zinc oxide (Larvik) | Pigment | 12 |
| Cuprous oxide (American Chemet) | Biocide | 40 |
| Polyamide wax (Disparlon A600-020X, Kusumoto Chemicals) | Thixotrope | 2 |
| Xylene | Solvent | 7 |

Examples 5 and 6

Preparation of Comparative Fouling Control Coating Compositions

Comparative fouling control coating compositions were made as described above for Example 4 except the polymer of Example 1 was substituted with the polymers of Example 2 and 3. Comparative fouling control composition 5 was formulated with the polymer of Example 2, and comparative fouling control composition 6 was formulated with the polymer of Example 3).

Antifouling Tests

The antifouling performance of Coating compositions Examples 4, 5 and 6 were compared by applying each of the compositions to a 60×60 cm marine plywood panel by roller to give a dry film thickness of about 150 microns. The boards had been pre-primed with Interprotect epoxy primer (International Paint Ltd). Each coating was allowed to cure fully under ambient conditions before the start of testing.

Test panels were simultaneously immersed in waters at Burnham (UK) and also simultaneously immersed in natural tropical marine waters at a depth of 0.54 to 1.0 m in Changi, Singapore where growth is known to be severe. The panels were periodically removed from the water to be photographed and the extent of fouling on the coatings was assessed prior to re-immersion of the panels.

| | Total % coverage of fouling | | |
|---|---|---|---|
| Location | Example 4 (a1) + (a2) | Example 5 (only (a2)) | Example 6 (only (a1)) |
| Burnham (UK) 5 months | 0% | 8.0% | 8.0% |
| Changi, Singapore 8 months | 27.0% | 47.0% | 48.0% |

After 5 months in the UK, and 8 months in Singapore waters, the coatings formed from Example 4 exhibited less fouling than the coatings formed from Examples 5 and 6.

The invention claimed is:

1. A polymer comprising:
   (a1) silyl ester group(s), and
   (a2) quaternary ammonium group(s) and/or quaternary phosphonium group(s), said quaternary ammonium groups and/or quaternary phosphonium groups being neutralised by counter-ions, wherein the counter-ions consist of the conjugate base of an acid having an aliphatic, aromatic, or alkaryl hydrocarbyl group.

2. The polymer of claim 1, wherein the silyl ester groups (a1), and/or the quaternary ammonium groups and/or quaternary phosphonium groups (a2), are located on side chains pendant to the polymer backbone.

3. The polymer of claim 1 wherein the polymer is formed from at least one (meth)acrylic monomer comprising the silyl ester group(s) (a1) and at least one (meth) acrylic monomer comprising the quaternary ammonium group(s) and/or quaternary phosphonium group(s) (a2).

4. The polymer of claim 3 wherein the weight ratio of the (meth) acrylic monomers comprising silyl ester groups to (meth)acrylic monomers comprising quaternary ammonium groups and/or quaternary phosphonium groups used to form the polymer ranges from 1:99 to 85:16, preferably from 5:95 to 60:40, more preferably from 12:88 to 47:53.

5. The polymer of a claim 3 wherein the polymer is also formed from one or more other vinyl polymerisable monomers.

6. The polymer claim 1 wherein the conjugate base of the acid comprises an aliphatic, aromatic, or alkaryl hydrocarbyl group comprising 6 or more carbon atoms.

7. The polymer of claim 1 wherein the conjugate base of the acid is a conjugate base of a sulphonic acid.

8. The polymer of claim 1, wherein the counter-ions of (a2) comprise less than 50 carbon atoms.

9. The polymer of any of claim 1 wherein the silyl ester group(s) (a1) are present on side chain(s) according to the Formula (I):

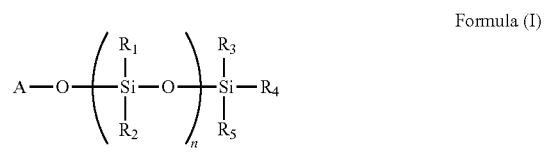

Formula (I)

wherein A is divalent —C(O)— or —S(O)$_2$O— group, n is 0 or an integer of 1 to 50, and R$_1$, R$_2$, R$_3$, R$_4$, and R$_5$ are each independently selected from the group consisting of optionally substituted C$_{1-20}$-alkyl, optionally substituted C$_{1-20}$-alkoxy, optionally substituted C$_{1-20}$ aryl, and optionally substituted C$_{1-20}$ aryloxy.

10. The polymer of claim 9, wherein n =0 and R$_3$, R$_4$, and R$_5$ are the same or different and represent methyl, isopropyl, n-butyl, isobutyl, ethyl, n-propyl, t-butyl or phenyl.

11. A fouling control coating composition comprising the polymer of claim 1 and an ingredient having biocidal properties for aquatic organisms.

12. The fouling control coating composition of claim 11, further comprising
   (a) a rosin material and/or
   (b) a non-hydrolysing, film-forming polymer.

13. A method of protecting a man-made structure immersed in water from fouling by applying the fouling control coating composition as defined in claim 11 to the man-made structure, allowing the fouling control coating composition to form a coating and then immersing the coated man-made structure in water.

14. A substrate or structure coated with the fouling control coating composition according to claim 11.

* * * * *